(12) United States Patent
Holton et al.

(10) Patent No.: US 10,643,322 B2
(45) Date of Patent: May 5, 2020

(54) SHAKER IMAGING AND ANALYSIS (71) Applicant: M-I L.L.C., Houston, TX (US)

(72) Inventors: Benjamin Lanning Holton, Covington, KY (US); Colin Stewart, Houston, TX (US); Brian Neil Ligertwood, Houston, TX (US)

(73) Assignee: M-I L.L.C., Houston, TX (US)

( * ) Notice: Subject to any disclaimer, the term of this patent is extended or adjusted under 35 U.S.C. 154(b) by 130 days.

(21) Appl. No.: 15/767,342

(22) PCT Filed: Oct. 12, 2016

(86) PCT No.: PCT/US2016/056483
§ 371 (c)(1),
(2) Date: Apr. 10, 2018

(87) PCT Pub. No.: WO2017/066212
PCT Pub. Date: Apr. 20, 2017

(65) Prior Publication Data
US 2019/0266717 A1 Aug. 29, 2019

Related U.S. Application Data

(60) Provisional application No. 62/240,304, filed on Oct. 12, 2015.

(51) Int. Cl.
*G06T 7/00* (2017.01)
*G01B 11/02* (2006.01)
(Continued)

(52) U.S. Cl.
CPC .......... *G06T 7/0004* (2013.01); *B01D 33/015* (2013.01); *B01D 33/804* (2013.01);
(Continued)

(58) Field of Classification Search
CPC .................... G06T 7/0004; G06T 7/73; G06T 2207/30108; B01D 33/015; B01D 33/804;
(Continued)

(56) References Cited

U.S. PATENT DOCUMENTS 6,464,082 B1 * 10/2002 Kimmel ................ B07C 5/3427
209/12.1
9,915,112 B2 * 3/2018 Geehan ................. E21B 21/065
(Continued)

OTHER PUBLICATIONS

International Search Report and Written Opinion for the equivalent International patent application PCT/US2016/056483 dated Jan. 26, 2017.
(Continued)

*Primary Examiner* — Taeho Jo
(74) *Attorney, Agent, or Firm* — Jeffrey D. Frantz (57) ABSTRACT

This disclosure is generally drawn to systems, devices, apparatuses, and/or methods, related to monitoring a shaker used for separating solids from fluid. Specifically, the disclosed systems, devices, apparatuses, and/or methods relate to capturing infrared images of a shaker or components thereof (e.g., shaker baskets, decks, screens) and performing actions on the shaker, its components, and/or the its operation based at least in part on the captured infrared images.

19 Claims, 10 Drawing Sheets

(51) Int. Cl.
  *G01F 23/292* (2006.01)
  *G01N 21/95* (2006.01)
  *B01D 33/01* (2006.01)
  *B01D 33/80* (2006.01)
  *G06T 7/73* (2017.01)
  *E21B 21/06* (2006.01)
  *G06T 7/246* (2017.01)

(52) U.S. Cl.
  CPC .......... *E21B 21/065* (2013.01); *G01B 11/022* (2013.01); *G01F 23/292* (2013.01); *G01N 21/95* (2013.01); *G06T 7/246* (2017.01); *G06T 7/73* (2017.01); *G06T 2207/10048* (2013.01); *G06T 2207/30108* (2013.01); *G06T 2207/30204* (2013.01)

(58) Field of Classification Search
  CPC ... E21B 21/065; G01B 11/022; G01F 23/292; G01N 21/95
  USPC ...................................... 250/338.1
  See application file for complete search history.

(56) References Cited

U.S. PATENT DOCUMENTS

| | | | |
|---|---|---|---|
| 2006/0243643 A1* | 11/2006 | Scott | B01D 33/0376 209/309 |
| 2011/0180107 A1* | 7/2011 | Dahl | B07B 1/4627 134/18 |
| 2011/0297373 A1* | 12/2011 | Timmerman | E21B 21/063 166/267 |
| 2013/0013100 A1* | 1/2013 | Dahl | B07B 1/46 700/218 |
| 2013/0329460 A1 | 12/2013 | Mathew et al. | |
| 2014/0113278 A1* | 4/2014 | Thomas | B01L 3/50853 435/5 |
| 2014/0119624 A1 | 5/2014 | Ehlers et al. | |
| 2014/0138323 A1* | 5/2014 | Jones | E21B 21/065 210/739 |
| 2014/0333754 A1* | 11/2014 | Graves | E21B 44/00 348/85 |
| 2015/0268374 A1 | 9/2015 | Rapoport | |
| 2016/0090799 A1* | 3/2016 | Geehan | E21B 21/065 210/740 |
| 2016/0119591 A1* | 4/2016 | Samuel | E21B 21/066 175/24 |
| 2018/0178220 A1* | 6/2018 | Moran | B03B 11/00 |

OTHER PUBLICATIONS

International Preliminary Report on Patentability for the equivalent International patent application PCT/US2016/056483 dated Apr. 26, 2018.

* cited by examiner

SHAKER IMAGING AND ANALYSIS

CROSS-REFERENCE TO RELATED APPLICATION

This application claims priority to and the benefit of a US Provisional Application having Ser. No. 62/240,304, filed 12 Oct. 2015, which is incorporated by reference herein.

BACKGROUND

Shakers that separate solids from fluids are used in many industries. In oilfield environments, for example, shakers separate solids (e.g., drill cuttings, particulates) from drilling fluid.

The area of an oil rig site used to mount shakers and related solids control equipment is very rudimentary and dangerous to human operators. On offshore rigs, for example, there is a shaker room with HVAC to remove potential volatile organic compounds, steam, and the like from the environment. Instrumentation in a shaker room is typically ruggedized to survive the vibrations and hostile environment. Further, such conditions make for a hostile working environment for humans, and many times access to this working environment is restricted.

BRIEF DESCRIPTION OF THE DRAWINGS

The foregoing and other features of the present disclosure will become more fully apparent from the following description and appended claims, taken in conjunction with the accompanying drawings. Understanding that these drawings depict several examples in accordance with the disclosure and are, therefore, not to be considered limiting of its scope, the disclosure will be described with additional specificity and detail through use of the accompanying drawings.

In the drawings:

FIG. 15 depicts a computer system; each arranged in accordance with at least an example of the present disclosure.

DETAILED DESCRIPTION

In the following detailed description, reference is made to the accompanying drawings, which form a part hereof. In the drawings, similar symbols identify similar components, unless context dictates otherwise. The illustrative examples described in the detailed description and drawings are not meant to be limiting and are for explanatory purposes. Other examples may be utilized, and other changes may be made, without departing from the spirit or scope of the subject matter presented herein. It will be readily understood that the aspects of the present disclosure, as generally described herein, and illustrated in the drawings, may be arranged, substituted, combined, and designed in a wide variety of different configurations, each of which are explicitly contemplated and made part of this disclosure.

This disclosure is generally drawn to systems, devices, apparatuses, and/or methods, related to monitoring a shaker used for separating solids from fluid. Specifically, the disclosed systems, devices, apparatuses, and/or methods relate to capturing images of a shaker or components thereof (e.g., shaker baskets, decks, screens) and performing actions on the shaker, its components, and/or the its operation based at least in part on the captured images.

Figure 1A:
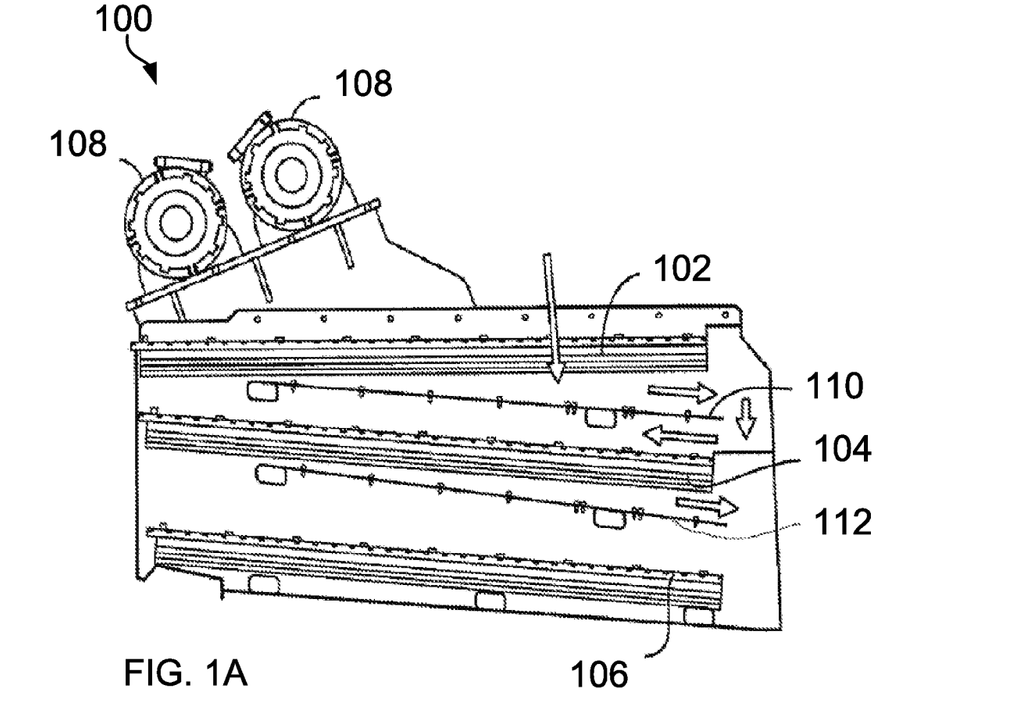
FIGS. 1A and 1B are side and perspective views, respectively, of a shaker.
Figure 1B:
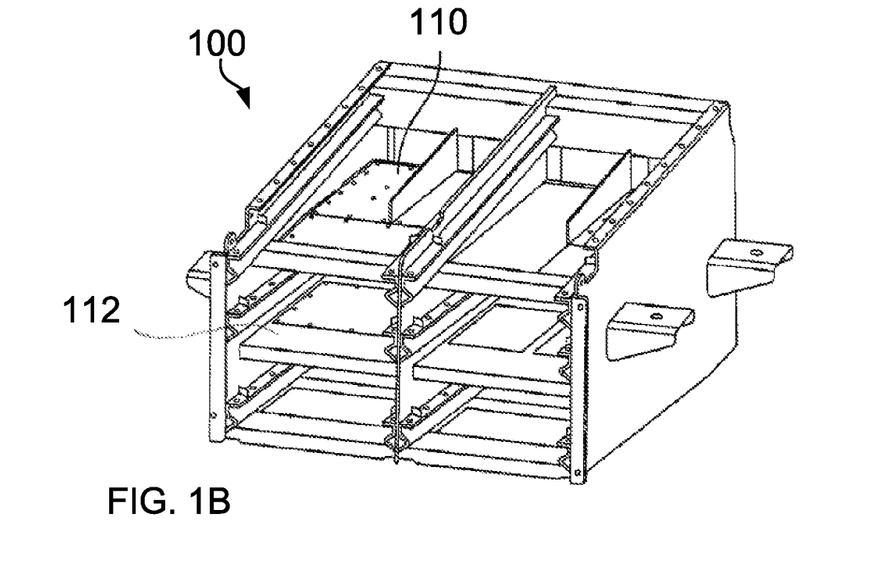

Referring now to FIGS. 1A and 1B, a cross-sectional view of a shaker 100 in accordance with one or more examples of the present disclosure is shown. The shaker 100 may include one or more screening decks, such as by including a top screening deck 102, one or more middle screening decks 104, and a bottom screening deck 106, as shown. Motor(s) 108 may also be attached to the shaker 100 to impart vibratory motion on the shaker 100 to assist with separating solids from fluid (e.g., drilling fluid) within the shaker 100.

Screen assemblies, which may include a mesh screen, may be provided on each of the screening decks 102, 104, and 106. As such, the screen assemblies may be installed within shaker 100 to filter out solids of various sizes from the drilling fluid according to the size of the respective mesh of the screen assembly. In some examples, the screen assembly be disposed on top of the screening decks 102, 104, and 106. In some examples, multiple screen assemblies may be installed in each of the screening decks 102, 104, and 106. These screen assemblies may be installed in series from an inlet end of the shaker 100 to an outlet end of the shaker 100. Those of ordinary skill in the art will appreciate that the present disclosure is not limited to any particular screen assembly or mesh screen arrangement.

Some examples disclosed herein relate to systems, devices, apparatuses, and/or methods that include an imaging device (e.g., camera) operatively coupled to the shaker 100. As used herein, "operatively coupled" may be used herein to refer to having an imaging device coupled to and/or adjacent the shaker 100 such that the imaging device may operate with, interact with, and/or be used in conjunction with the shaker 100. An imaging device may be operatively coupled to the shaker 100 such that the imaging device may be used for purposes of monitoring the shaker 100 and the fluid and solids being processed by the shaker 100. The imaging device may be disposed adjacent or in proximity to shaker 100 or between multiple shakers 100, such as by arranging the imaging device on a floor of a drilling rig with the shaker 100, positioning the imaging device on a post or stand in proximity to the shaker 100, connecting the imaging device to the shaker 100, or any other configuration or arrangement such that the imaging device may operate and be used in conjunction with the shaker 100.

In some examples, the imaging device may include cameras (still and/or video) and/or sensors. Some example cameras may have the ability to capture the infrared light range (700 nm-1 mm wavelength) or the visible light range (380 nm-700 nm wavelength), for example. A camera and/or video camera may produce a real-time (or near real-time) image of the shaker 100 and/or components thereof (e.g., screening decks 102, 104, 106, screen assemblies), and may transmit the real-time image to an analysis system.

Some examples may include an infrared camera. Infrared cameras capture images in the infrared light spectrum such as those depicted in FIGS. 2-11. Infrared cameras capture infrared emissions of an object or area being imaged. For example, infrared emissions may include thermal imaging which reflects or represents temperatures of areas in an image such that relative temperatures between areas in an image may be determined. Generally, blue portions of infrared images represent the lowest relative temperatures, green portions represent higher relative temperatures, yellow portions represent even higher relative temperatures, and red portions represent the highest relative temperatures. Infrared imaging may allow for many functions, including identifying, measuring, and analyzing regions within a shaker where fluid is present and where solids are present.

Figure 2:
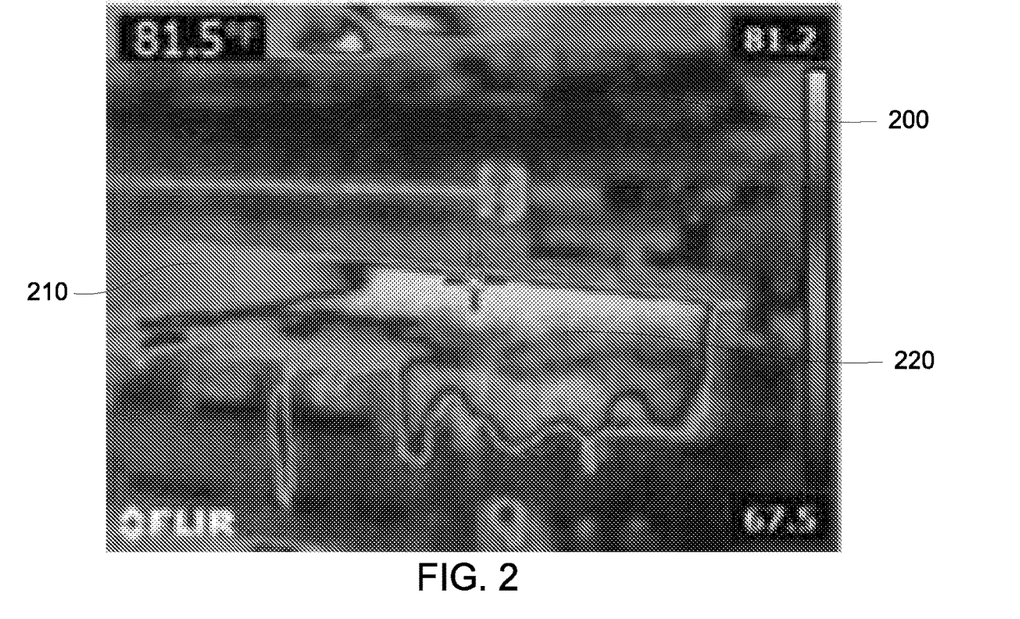
FIGS. 2-4 are infrared images depicting fluids and solids in an example shaker.
Figure 3:
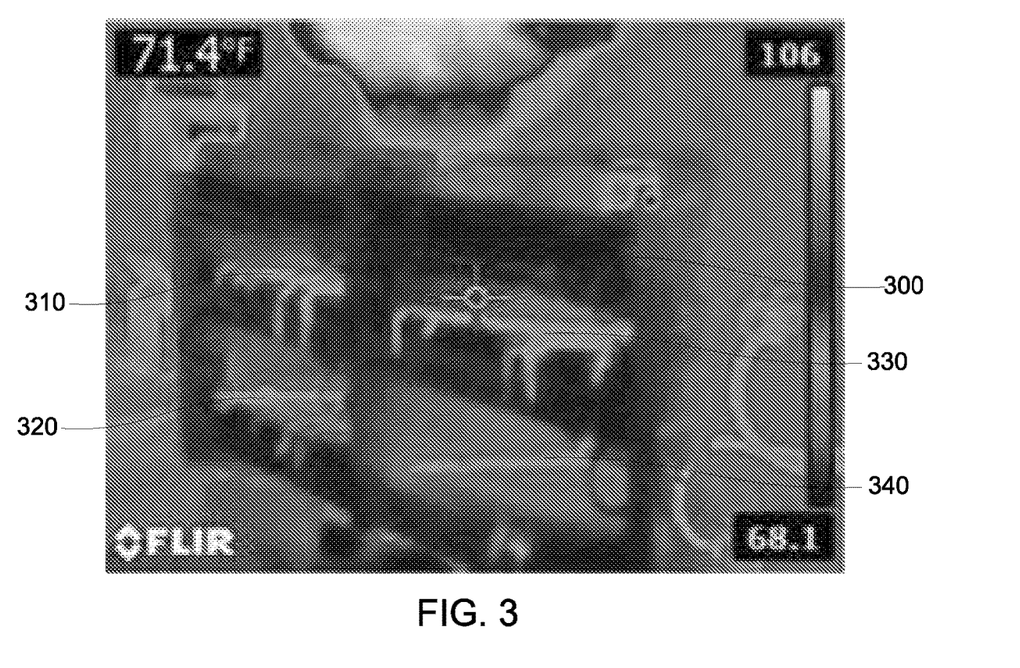
Figure 4:
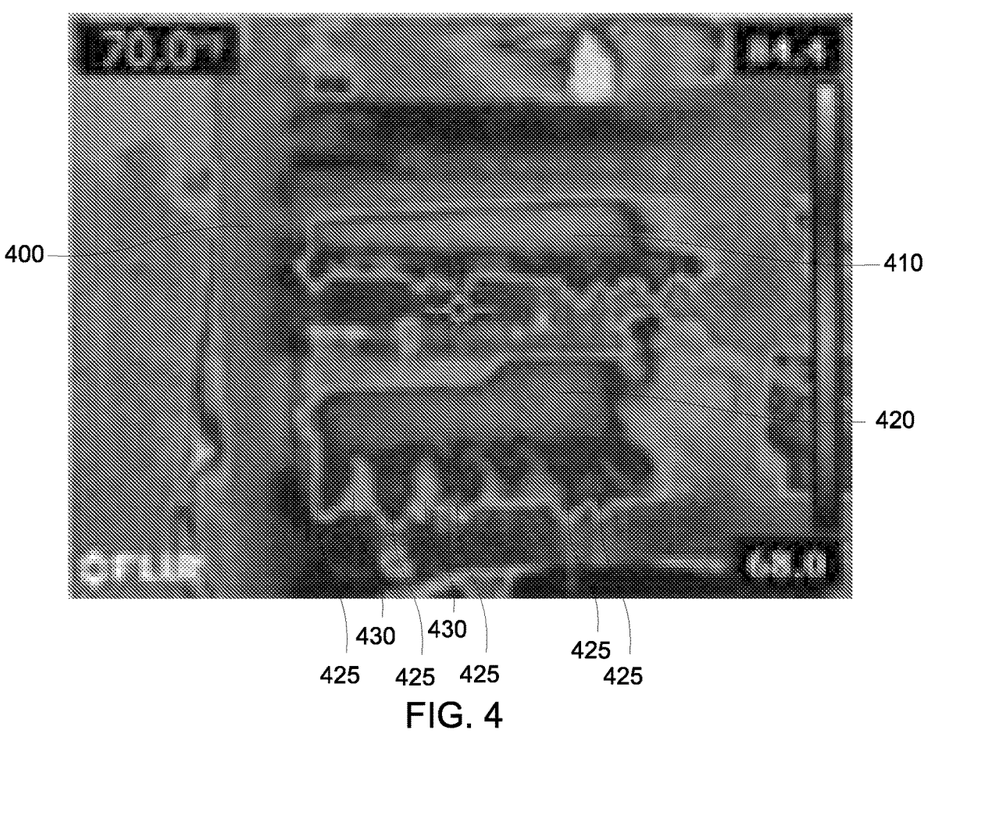

FIGS. 2-4 are infrared images depicting fluids and solids in an example shaker. These images may identify a beach point in a shaker, which is at the intersection between a fluid region and a solids region on a screen assembly. As shown in FIGS. 2-4, there are areas of varying temperature in the shaker.

For example, FIGS. 2 and 4 show close up views of screen assemblies in the shaker 200, 400. Different colored portions of the images are distinguished. For example, a red portion 220, 410, 420, 425 in the images is distinguished from the yellow/green portions 210, 430. The relative temperature of the solids with respect to the fluid provides a distinct boundary in the infrared images. The boundary between these two regions represents the beach point where solids exist on the screen assembly and the fluid pond where fluid exists. An analysis system may include algorithms to distinguish between a fluid pond and a beach point consisting of solids. The red portions 220, 410, 420, 425 in FIGS. 2 and 4 represents a fluid portion where fluid exists in the shaker (and specifically, on the screen assembly), while the yellow/green portions 210, 430 represents a solids portion where solids exist. As solids and/or fluids exit the screen near an outlet end of the shaker, the solids and/or fluids may drip or fall off the screen (as shown in FIG. 4).

FIG. 3 shows a more distant view of the shaker 300. Fluid and/or solids that are present in the shaker are represented by the yellow/green portions 310, 320, 330, 340, while the shaker and its components are the blue portion 300. In this manner, one can easily distinguish the presence or absence of fluid and/or solids 310, 320, 330, 340 in the shaker 300.

Figure 5:
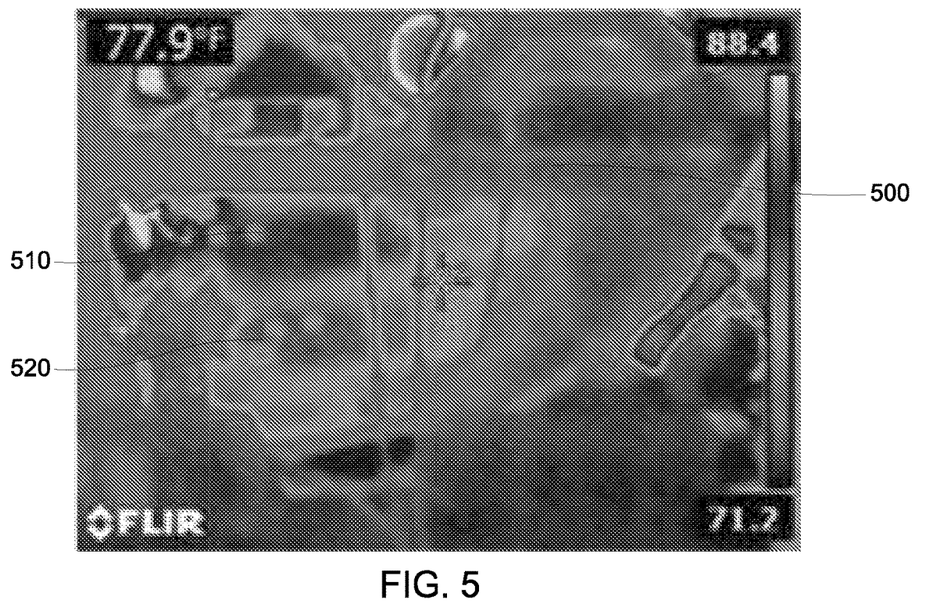
FIGS. 5-6 are infrared images depicting fluid levels in an example shaker.
Figure 6:
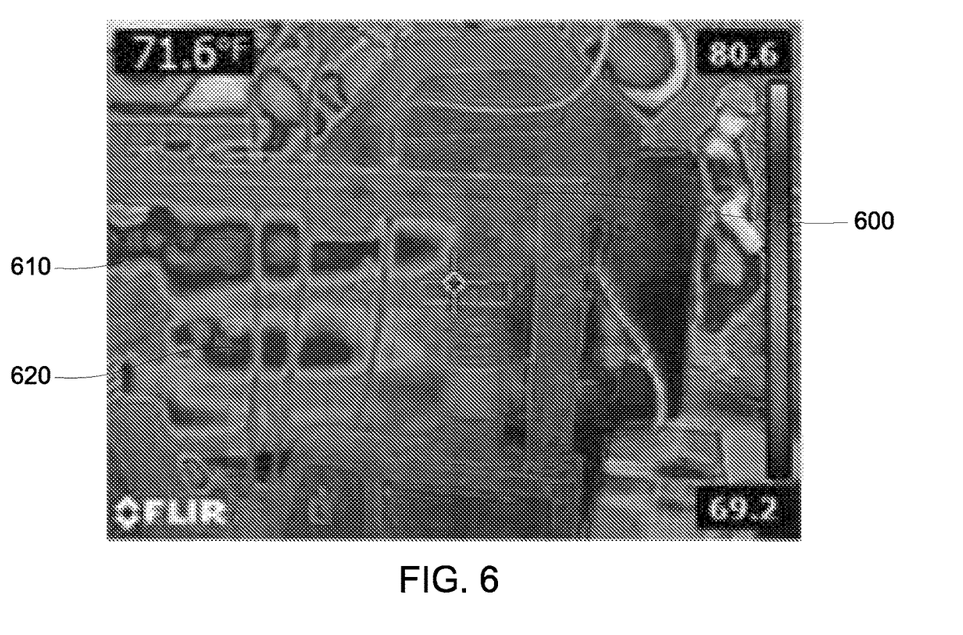

FIGS. 5-6 are infrared images depicting fluid levels in an example shaker. In some examples, the imaging device may determine or measure the fluid level 510, 520, 610, 620 through the screen deck sidewall 500, 600. FIGS. 5-6 are images taken from the side portion of the shaker 500, 600. In these examples, probes having high thermal conductivity may be used to determine temperatures of the fluid 510, 520, 610, 620 within the shaker 500, 600. Some example probes may include rods or bolts that protrude into the fluid and through the sidewall. The camera and/or a database in communication with the camera and/or probes may use the information obtained by the probes to extrapolate the fluid position. For example, the probes may sense a difference in temperature from the fluid versus the surrounding environment to determine the position of the fluid.

In some examples, the shaker 500, 600 may have a window or transparent portion on the side(s) of the shaker 500, 600 to allow imaging (e.g., infrared imaging) from the side of the shaker 500, 600. This window may aid in beach length measurement by an infrared camera.

Figure 7:
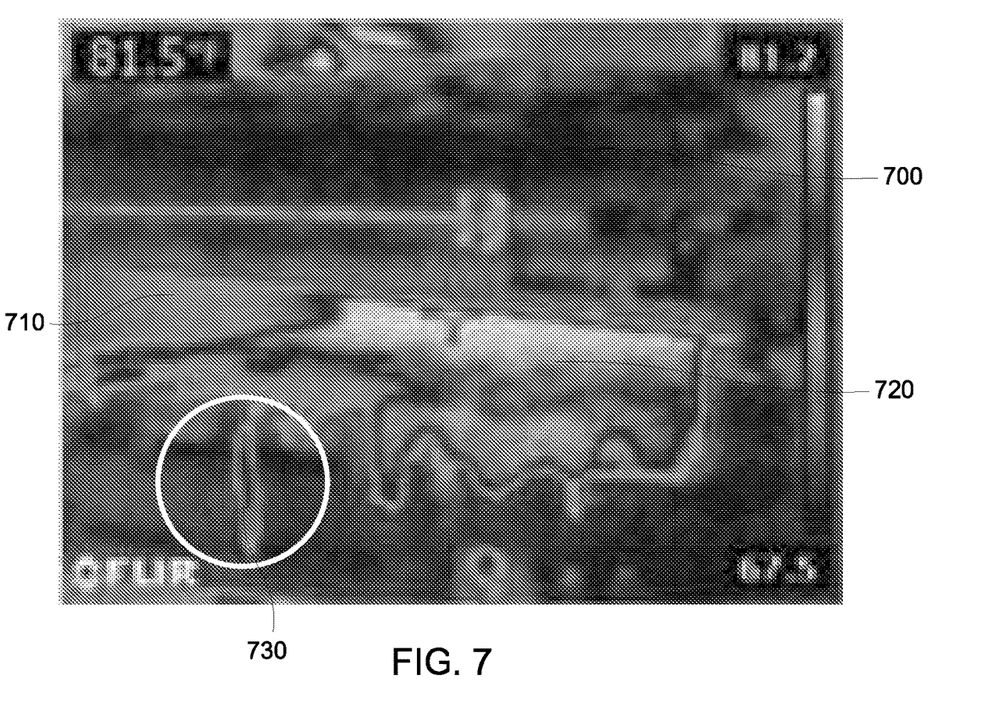
FIGS. 7-8 are infrared images depicting solids having varying moisture levels in an example shaker.
Figure 8:
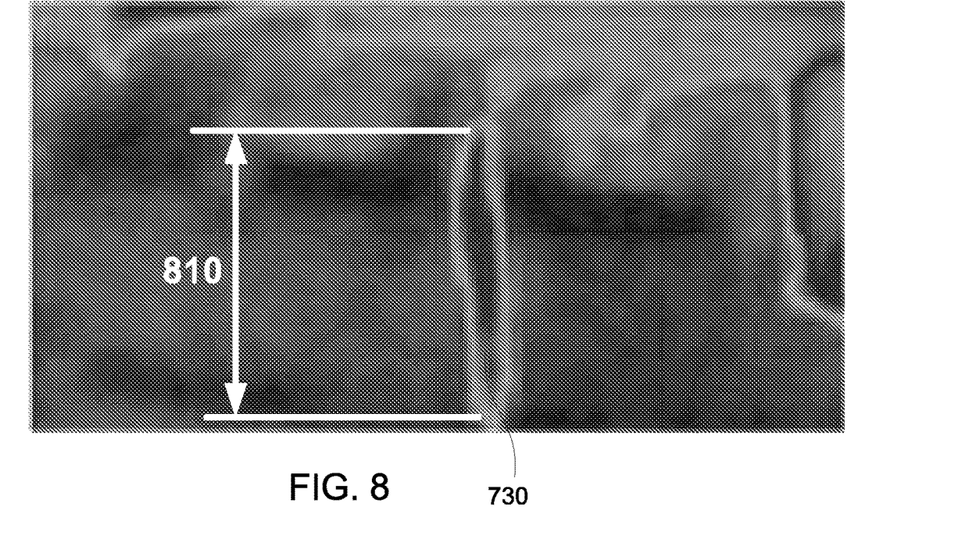

FIGS. 7-8 are infrared images depicting solids having varying moisture levels in an example shaker 700. Using an infrared or visible light camera, the system may determine size and amount of solids on the screen assemblies in the shaker 700. For example, the imaging system may be able to determine the moisture level of solids based on how far the solids drips as the solids fall off the outlet end of the shaker. A white circle in FIG. 7 identifies example dripping solids 730. Generally, drier solids maintain their shape 710, while wetter solids 720 may drip off the shaker 700 more easily. In the example of FIG. 8, the drip length 810 of solids 730 may be measured to determine moisture levels and/or moisture percentages.

Figure 9:
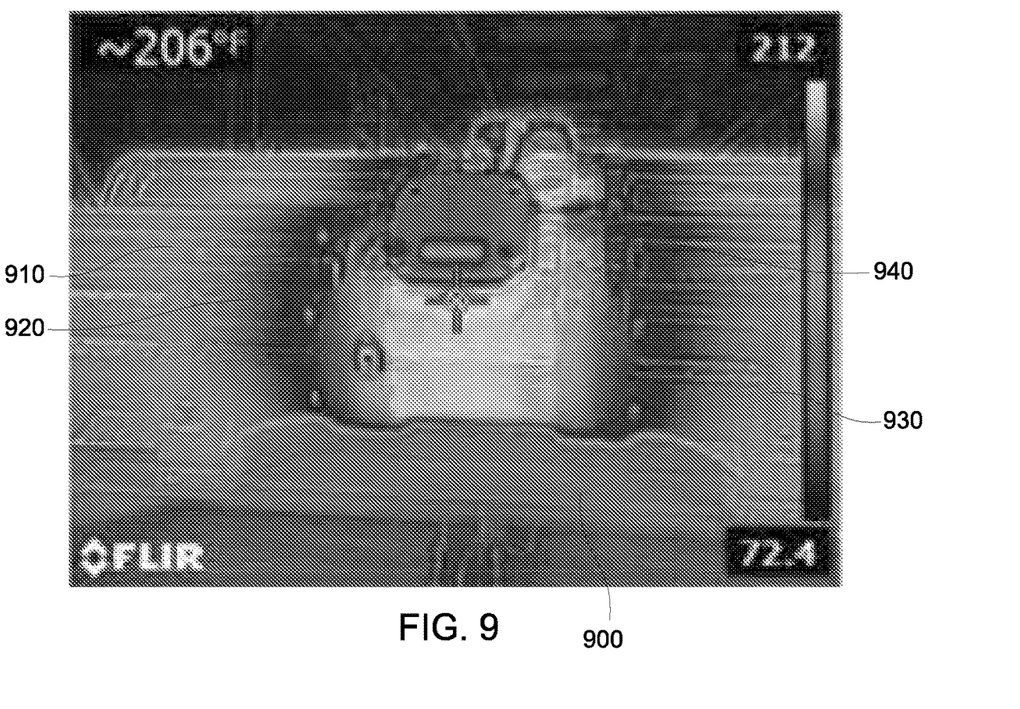
FIG. 9 is an infrared image depicting stressed areas in an example shaker.

FIG. 9 is an infrared image depicting stressed areas in an example shaker 900. In some examples, infrared cameras may identify "hot spots," or portions of the shaker that are relatively high temperature 920, 940 when compared to other portions 910, 930. These hot spots 920, 940 may be due to stresses (e.g., mechanical stresses, environmental stresses) that the shaker 900 is undergoing during operation. FIG. 9 shows that the motor 910, 920, 930, 940 of the shaker 900 is at a relatively higher temperature than other portions of the shaker 900. This may be normal in some instances, but in other instances, this may be cause for concern by the shaker operator.

The imaging device may also assist in maintaining the shaker. In some examples, loose bolts or fasteners may create hot spots that may be visualized in infrared images. When bolts in a shaker loosen, this may cause fretting or relative movement, which may cause the temperature to rise between the bolt and the shaker portion receiving the bolt. This increase in temperature may be easily perceived using infrared imaging.

Bearing or motor health may be determined by using a database and/or camera to determine the actual vibrational profile relative to an ideal vibration profile. Sounds may be recorded to compare the sounds of an ideal or at least undamaged bearing and/or motor to a bearing and/or motor that is partially damaged and/or needs replaced.

Figure 10:
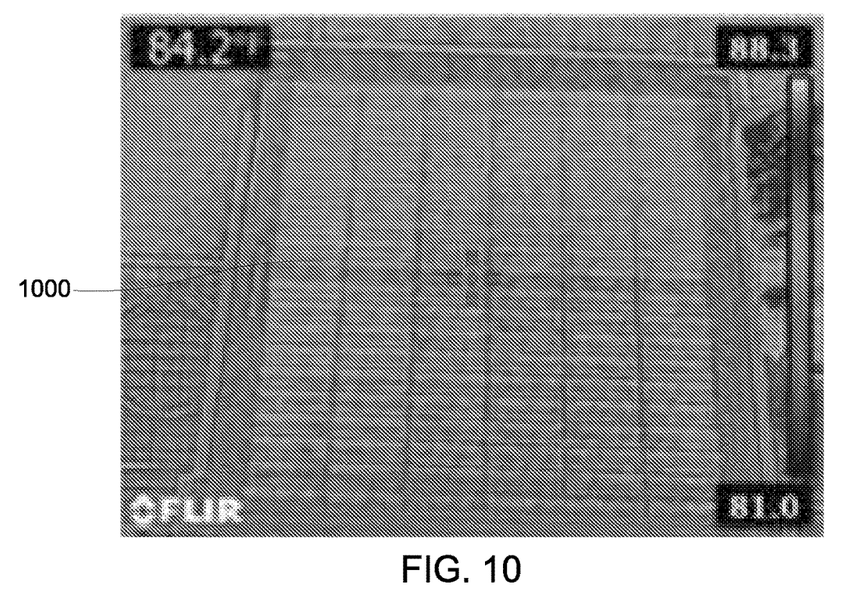
FIGS. 10-11 are infrared images depicting screen assembly inspection in an example shaker.
Figure 11:
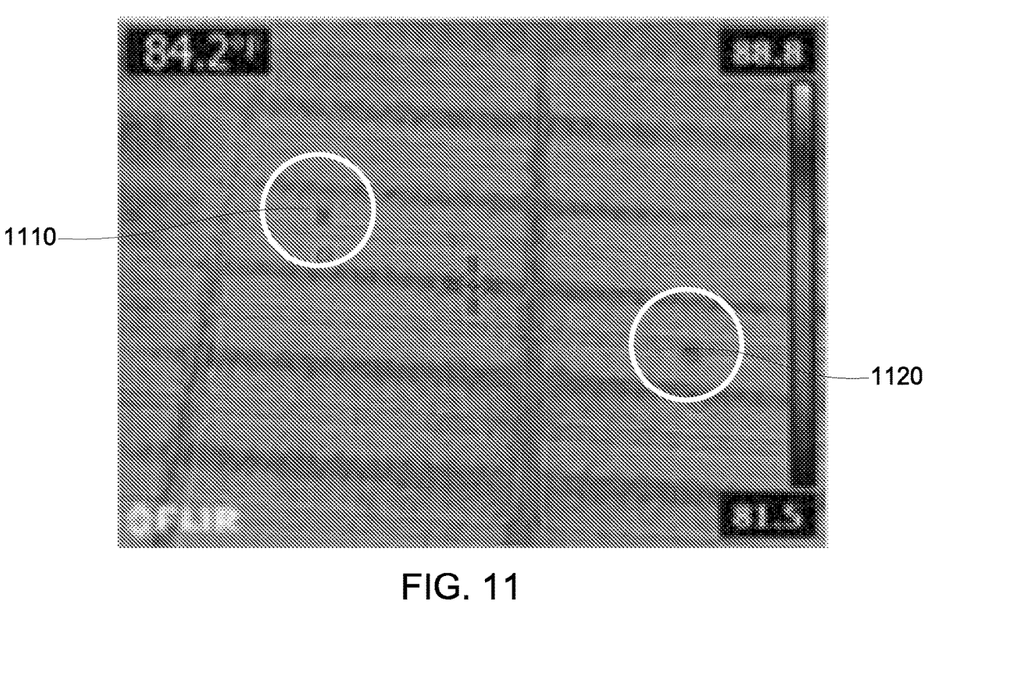

FIGS. 10-11 are infrared images depicting screen assembly 1000 inspection in an example shaker. Infrared imaging may allow better screen mesh 1000 damage inspection than visible light imaging. Infrared imaging of the screen assembly 1000 may be improved by blowing cold or hot air beneath the screen assembly and capturing infrared imaging from the infrared camera above the screen assembly 1000. In this manner, mesh tears 1110, 1120 in the screen assembly 1000 will allow the cold or heated air to flow through and can be visualized on camera. For example, the example of FIG. 11 includes cooler air flowing under the screen assembly 1000, and FIG. 11 shows two places 1110, 1120 (circled for clarity) in which mesh tears may be present based on the green portions 1110, 1120 (indicating a lower temperature than the yellow portion). These two green portions 1110, 1120 are indicative of mesh tears in those locations.

The imaging device may measure the amount of light shining through the mesh at multiple points to identify areas in which more light shines through the mesh. Based on the light throughput, the imaging device may determine the length and width of tears and/or the size of holes in the mesh to determine if they exceed acceptable values. When the imaging device identifies an area of relatively greater light shining through the mesh, it may determine that the mesh of the screen assembly is damaged and may discard the screen assembly.

In some examples, screen assemblies may be tracked via the imaging device. For example, the imaging device may track the location and/or usage of screen assemblies. This process may include collecting and storing information about each screen assembly such as its mesh size, the location in the shaker where the screen assembly was installed, the amount of time the screen assembly has been in used in the shaker, conditions in the shaker when the screen assembly was in use, damage to the screen assembly, and/or failures of the screen assembly. This information may be collected and stored in a database.

The imaging device may incorporate tags coupled to screen assemblies.

Example tags may include tags that emit infrared radiation and may be passive (such as "glow-in-the-dark" tags) or active in nature. For example, tags may be manufactured using a coating or material in which selected light wavelengths can be either reflected or absorbed. In some examples, the coating or material may reflect infrared light while absorbing visible light. In this manner, an infrared imaging device may be able to detect or identify tags on screen assemblies, while the human eye or a visible light camera may not detect or identify the tags.

Each screen assembly may have a unique tag such that each individual tag may be uniquely identified by the imaging device. In other examples, different categories of screens may have a unique tag. For example, screens having the same mesh type or size may be similarly tagged. In this manner, tags of the same type may be identified for screen replacement, for example.

In some examples, an infrared marker (e.g. tape) may be coupled to screen assemblies. The marker may indicate a desired or optimal beach length (e.g., 75% beach length) of the screen assembly. In this manner, the imaging device may more easily determine beach length relative to the desired or optimal location.

The imaging device may transmit information to other system components (e.g., analysis system, control system) through wireless means such as infrared communication, wireless networking, and the like. Information being transmitted may relate to operational aspects of the shaker such as acceleration of the shaker, run-time of the shaker, and diagnostic data. In some examples, information being transmitted may relate to screen assembly information such as screen assembly damage, screen assembly usage, and the like.

In some examples, a visible light camera may be incorporated in addition to or instead of an infrared camera. A high speed camera may capture and identify maintenance issues, capture and identify screen issues, capture and identify spring issues, measure displacement of the shaker, and measure acceleration of the shaker, among other aspects. For example, the camera may identify loose hoses or other parts in or around the shaker, and may cause an alert so the shaker operator may address the issue.

In another example, the camera may determine if the shaker screen assembly is whipping or moving substantially more than the shaker basket or deck. If so, the camera may signal the operator and/or speed up or slow down the shaker motors to see if the resultant large deflection of the screen assembly is the result of a resonance or natural frequency. By identifying and addressing screen whipping/movement, screen assembly life may be substantially improved. In some examples, the shaker operation may be adjusted (e.g., adjust screen pulse duration or intensity) based on the screen assembly condition.

In some examples, the camera may determine or effectively measure the spring deflection of the shaker. Using known techniques, the spring deflection may allow one to determine the effective mass or loading on the shaker.

The image device may measure displacement (or stroke) of the shaker. By measuring displacement of the shaker, one can determine the acceleration of the shaker (assuming the speed of the shaker is known). One way the camera may measure the displacement of the shaker is through use of displacement tags coupled to the shaker or components thereof.

Figure 12:
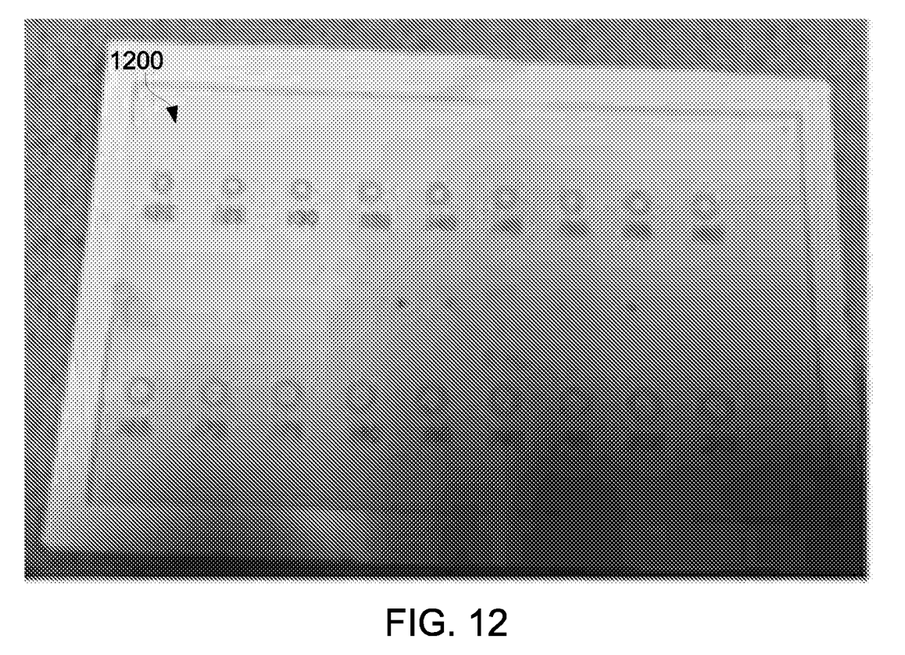
FIGS. 12-13 depict example displacement tags for an example shaker imaging system.
Figure 13:
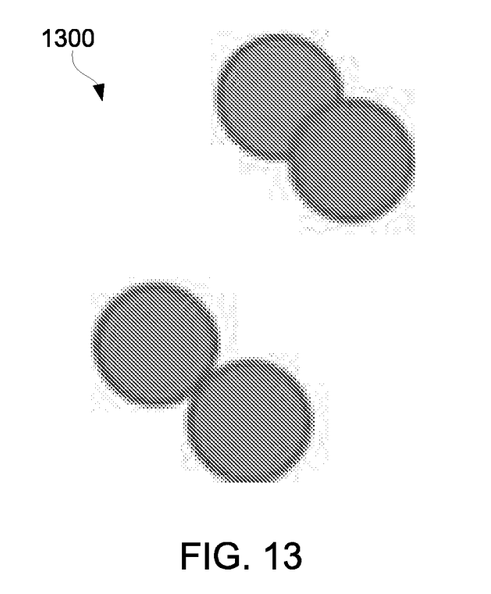
Figure 14:
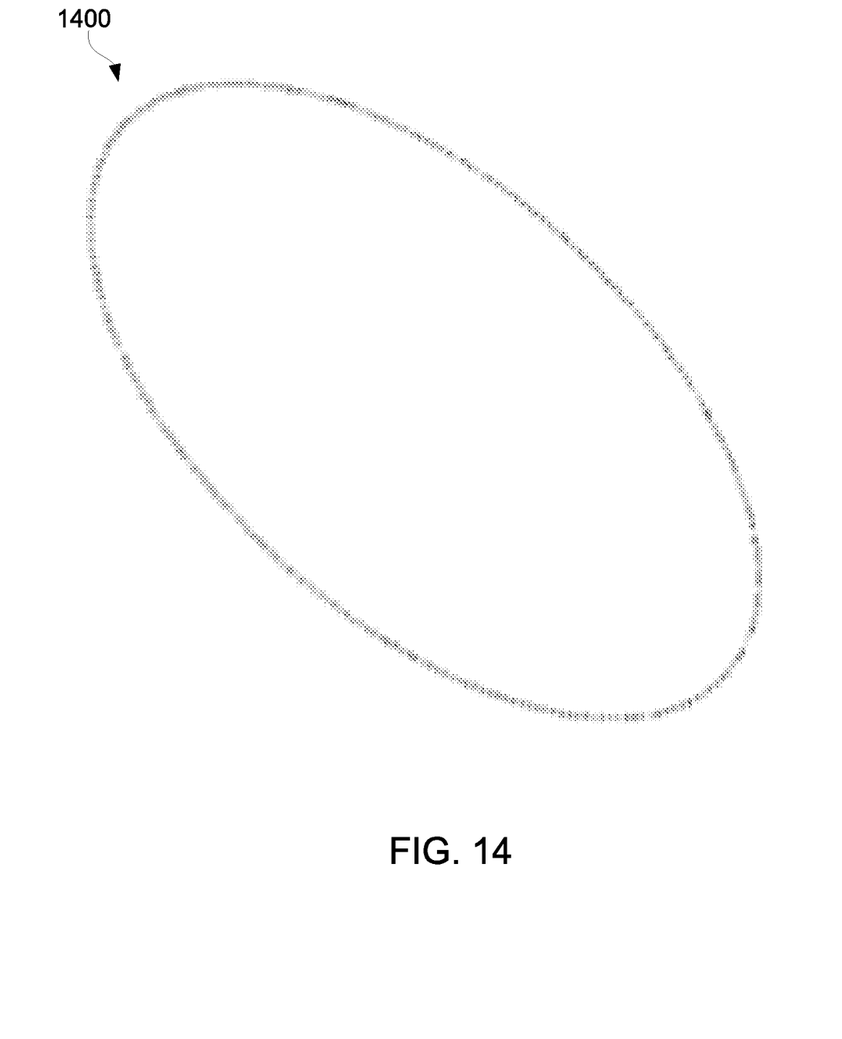
FIG. 14 depicts an example motion pattern of an example displacement tag during operation of an example shaker.

FIGS. 12-13 depict example displacement tags 1200, 1300 for an example shaker imaging system. Displacement tags 1200, 1300 may be useful to determine acceleration of the shaker. If the speed of the shaker is known and the displacement is measured, then the acceleration of the shaker may be calculated. The stroke or displacement of the shaker may be determined by where the two circles 1300 are tangent to each other. The displacement tags 1200, 1300 may aid the camera in plotting the shape of the motion. For example, if there is a displacement tag 1200, 1300 in the shape of a small dot placed on a side of shaker, this will form motion shape (while the shaker is in operation) which the camera can be recorded. FIG. 14 depicts an example motion pattern 1400 of an example displacement tag during operation of an example shaker. In addition to a marker to determine motion profile/acceleration, using this may help determine the health of shaker and/or to maintain constant G forces.

In some examples, the camera may determine an angle of a shaker deck by recording or capturing a deck angle indicator on a shaker deck. The camera may also compare and/or compute the distance from the ground or skid of the shaker to the screen nearest the discharge end to determine the deck angle.

In some examples, the imaging device may determine or sense mineralogy or chemical properties of the fluid or solids in the shaker. For example, the imaging system may determine the type of drilling fluid (e.g., oil-based, water-based) being processed in the shaker. If the drilling fluid type is determined, the operator or a system controller could adjust operation of the shaker (e.g., vibration mode, deck angle adjustment). In some examples, this information may be fed into other sensors such as calibrating a capacitance probe for oil-based fluid or water-based fluid.

In some examples, the imaging system may control the operation of the shaker based upon a measured or sensed property of the solids and/or the fluid. For example, the imaging device may determine the moisture of the fluid in the shaker. In turn, the imaging system may adjust the operation of the shaker to increase dryness of the fluid. The acceleration of the shaker may be adjusted and/or the screen assemblies may be pulsed in an effort to increase dryness.

In some examples, the imaging device may sense or measure the height of solids and/or fluid above the screen assembly to indicate screen blinding, which may occur when some or all of the screen's open area is blocked by solids and/or fluid. A threshold amount may be set such that solid/fluid heights above that threshold may trigger an alarm or message for the operator to check the screen assemblies for blinding, change screen assemblies, or take other actions.

Figure 15:
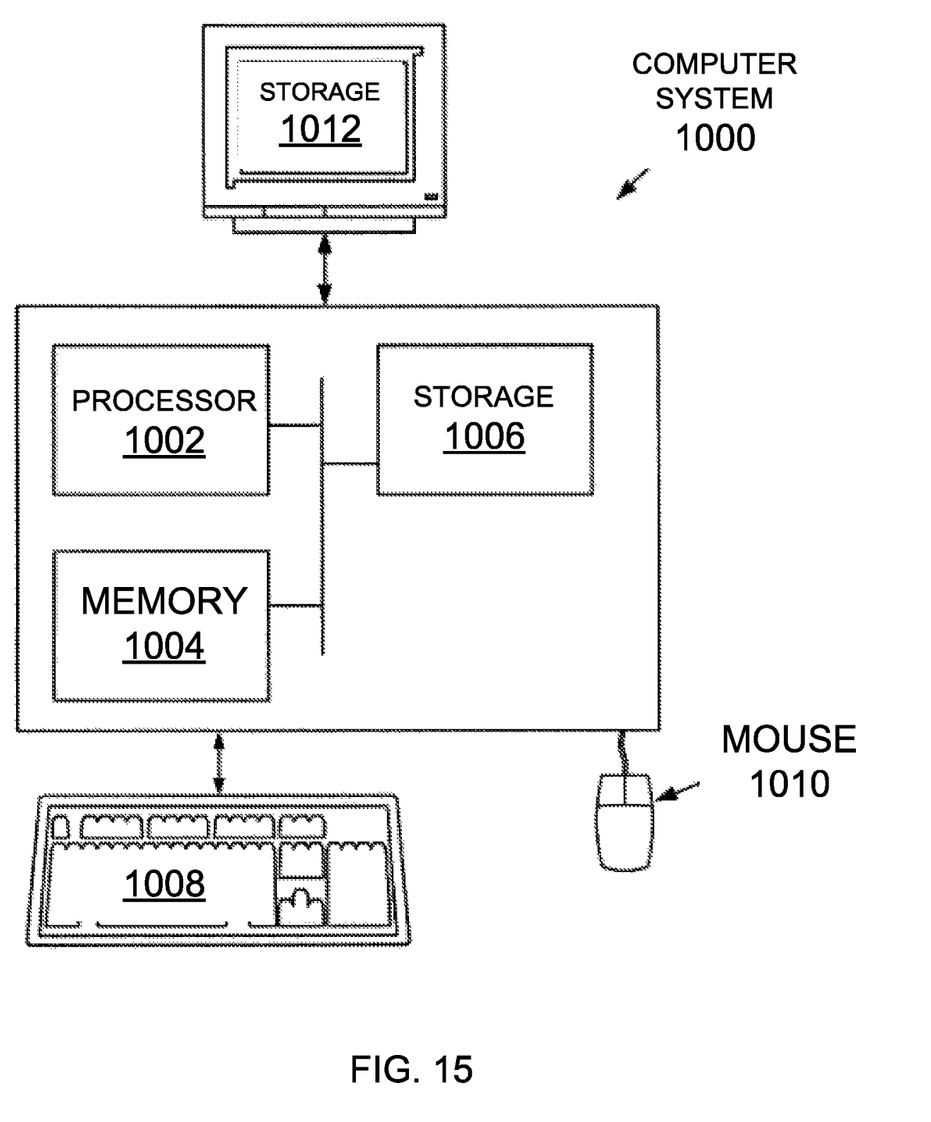

One or more examples of the present disclosure may be implemented on any type of computer system or computer device. The imaging device, for example, may include a computer system. For example, as shown in FIG. 15, a computer system 1000 may include a processor 1002, associated memory 1004, a storage device 1006, and numerous other elements and functionalities typical of known computers. The memory 1004 may include instructions for causing the computer system 1000 to monitor and analyze images and control processes for the shaker and/or drilling operations in accordance with some examples of the present disclosure.

The computer system 1000 may also include input means, such as a keyboard 1008 and a mouse 1010, and output means, such as a monitor 1012. The computer system 1000 may be connected to a local area network (LAN) or a wide area network (e.g., the Internet) via a network interface connection. Those skilled in the art will appreciate that these input and output means may take other forms, now known or later developed.

Further, those skilled in the art will appreciate that one or more elements of the computer system 1000 may be located at a remote location and coupled to the other elements over a network. Some examples may be implemented on a distributed system having a plurality of nodes, where portions of the present disclosure may be located on a different node within the distributed system. In some examples, the node corresponds to a computer system. Alternatively, the node may correspond to a processor with associated physical memory. The node may alternatively correspond to a processor with shared memory and/or resources. Further, software instructions to perform some examples of the present disclosure may be stored on a tangible computer readable medium such as a digital video disc (DVD), compact disc (CD), a diskette, a tape, or any other suitable tangible computer-readable storage device.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A device for monitoring a shaker having a screen, comprising:
   an infrared imaging device providing an image output corresponding to infrared emissions of an area being imaged, the infrared imaging device being operatively coupled to the shaker; and
   a computing device including a display that displays the image output, the computing device being communicatively coupled to the imaging device;
   wherein the area being imaged is a portion of the screen, the screen having an accumulation of one or more of solids and liquids disposed thereon;
   wherein the computing device measures a drip length of a solid as the solid exits the screen; and
   wherein the computing device determines the moisture content of the solids based on the measured drip length.

2. The device of claim 1, wherein the image output is displayed in a plurality of colors in the visible light spectrum, wherein the colors correspond to the infrared emissions of the area being imaged.

3. The device of claim 1, wherein the image output is displayed in a greyscale, wherein a variation of grey colors corresponds to the infrared emissions of the area being imaged.

4. The device of claim 1, further comprising a displacement tag coupled to the screen, wherein the displacement tag is uniquely visible to the infrared imaging device.

5. The device of claim 4, wherein:
   the area being imaged includes the displacement tag;
   when the shaker is in operation, the computing device plots a motion pattern of the screen by plotting the location of the displacement tag within the area being imaged over a time period; and
   if the computing device plots an abnormal motion pattern, the computing device at least one of generates an alarm and adjusts the operation of the shaker to adjust the motion of the screen.

6. The device of claim 1,
   wherein the solids and liquids have variations in temperatures; and
   wherein the infrared emissions of the area being imaged are measured in wavelengths and correspond to relative temperatures of a portion of the area being imaged.

7. The device of claim 1, wherein the area being imaged includes a beach point of solids and liquids on the screen, and wherein the beach point is identified by a difference of colors on the image output.

8. The device of claim 7, wherein the computing device monitors a length of the beach point and generates an alert when the beach point reaches a predetermined length.

9. The device of claim 1, wherein the fluid level of a fluid disposed on the screen is measured by positioning the infrared imaging device to provide the image output through a sidewall of a screen deck of the shaker.

10. The device of claim 9, wherein a blinding level of the screen is calculated by measuring the fluid level.

11. The device of claim 1, further comprising:
    an air blower positioned below the screen and configured to blow air against the underside of the screen, the air having a temperature differing from a temperature of the screen;
    wherein a defect in the screen is visible on the image output.

12. The device of claim 11,
    wherein the defect is one of a hole and a tear;
    wherein the image output indicates the temperature of the air from the air blower as a first color and the temperature of the screen as a second color; and
    wherein the defect appears in the first color and the screen appears in the second color.

13. The device of claim 1,
    wherein the imaged area is a portion of the shaker known to be susceptible to mechanical stress;
    wherein a stress point, when the portion of the shaker is under abnormal mechanical stress, emits infrared light of a different wavelength than the surrounding area, and wherein the computing device triggers an alert when the image output indicates the stress point under abnormal mechanical stress.

14. A method of monitoring a shaker having a screen, the method comprising:
    positioning an infrared imaging device adjacent the shaker, the infrared imaging device generating an infrared image of at least a portion of the shaker;
    monitoring, by the infrared imaging device, a screen in the shaker, the screen having an accumulation of one or more of solids and liquids disposed thereon;
    measuring, by a computing device communicatively coupled to the infrared imaging device, a drip length of a solid as the solid exits the screen; and
    determining, by the computing device, the moisture content of the solids based on the measured drip length.

15. The method of claim 14,
    wherein the solids and liquids have variations in temperatures; and
    wherein infrared emissions of the solids and liquids are measured in wavelengths that correspond to relative temperatures of the solids and liquids disposed on the screen.

16. The method of claim 14, further comprising:
outputting the infrared image as a plurality of colors in the visible light spectrum, wherein the colors correspond to infrared emissions of the at least the portion of the shaker being imaged.

17. The method of claim 14, further comprising:
identifying an abnormal condition of the screen or the shaker based on a difference of colors on the infrared image.

18. The method of claim 17, further comprising at least one of:
generating an alarm in the presence of an abnormal condition of the screen or the shaker; and
adjusting the operation of the shaker in the presence of the abnormal condition of the screen or the shaker.

19. The method of claim 14, wherein monitoring, by the infrared imaging device, the screen in the shaker further comprises:
identifying a property of one or more of the shaker, the screen, solids disposed on the screen, and liquids disposed on the screen, the property being one of a temperature, a structural abnormality, and an operational condition.

\* \* \* \* \*